US009939104B2

(12) United States Patent
Smith

(10) Patent No.: US 9,939,104 B2
(45) Date of Patent: Apr. 10, 2018

(54) MAGNETIC MOUNT

(71) Applicant: David C. Smith, Chattanooga, TN (US)

(72) Inventor: David C. Smith, Chattanooga, TN (US)

( * ) Notice: Subject to any disclaimer, the term of this patent is extended or adjusted under 35 U.S.C. 154(b) by 0 days.

(21) Appl. No.: 14/836,398

(22) Filed: Aug. 26, 2015

(65) Prior Publication Data

US 2016/0061380 A1 Mar. 3, 2016

Related U.S. Application Data

(60) Provisional application No. 62/041,863, filed on Aug. 26, 2014.

(51) Int. Cl.
| | | |
|---|---|---|
| *F16M 11/00* | (2006.01) | |
| *F16M 13/02* | (2006.01) | |
| *A47G 29/10* | (2006.01) | |
| *B25H 3/00* | (2006.01) | |
| *F16B 1/00* | (2006.01) | |

(52) U.S. Cl.
CPC ........... *F16M 13/022* (2013.01); *A47G 29/10* (2013.01); *B25H 3/00* (2013.01); *F16M 13/025* (2013.01); *F16B 2001/0035* (2013.01)

(58) Field of Classification Search
CPC .. Y10T 24/32; Y10T 29/49826; Y10T 292/11; Y10T 29/49947; Y10T 24/45534; Y10T 29/49998; Y10T 16/35; Y10T 24/1959; Y10T 24/20; Y10T 24/206; Y10T 16/5401; Y10T 24/314; Y10T 29/49002; Y10T 29/49; Y10T 24/36; Y10T 24/3651; Y10T 24/3911; Y10T 24/3916; Y10T 24/40; Y10T 24/44034; Y10T 24/44282; Y10T 24/44291; Y10T 24/44376; Y10T 24/44385; Y10T 24/44453; Y10T 24/4453; Y10T 24/44564

USPC .... 248/206.5, 220.1, 220.21, 220.22, 231.91
See application file for complete search history.

(56) References Cited

U.S. PATENT DOCUMENTS

| | | | | |
|---|---|---|---|---|
| 830,792 | A * | 9/1906 | Kuhne | .................... E04F 13/06 52/257 |
| 5,313,754 | A | 5/1994 | Jensen | |
| 6,550,155 | B1 * | 4/2003 | Hsu | ...................... G01B 3/1005 242/395 |
| 8,371,081 | B2 * | 2/2013 | Bennett | ................. E04F 19/028 52/255 |
| 9,252,581 | B2 * | 2/2016 | Stechmann | .............. H02G 3/32 |
| 9,273,819 | B2 * | 3/2016 | Pinchevski | .......... F16M 13/022 |
| 2008/0250608 | A1 | 10/2008 | Konecek-Hughes | |

(Continued)

FOREIGN PATENT DOCUMENTS

| | | |
|---|---|---|
| CN | 203263249 U | 11/2013 |
| WO | 96/00029911 A1 | 10/1996 |

OTHER PUBLICATIONS

International Search Report and Written Opinion dated Feb. 25, 2016, PCT Application No. PCT/US2015/046942, filed Aug. 26, 2015.

*Primary Examiner* — Steven Marsh
(74) *Attorney, Agent, or Firm* — Cygan Law Offices P.C.; Jeffrey S. Dixon

(57) ABSTRACT

A device for holding objects such as key rings, security cameras, and the like to the corner of a pair of walls. The device is a mount having a pair of bodies each having magnets and attachment features. The device also includes connectors which can be used to connect mounts together and object supports which can be attached in multiple ways.

5 Claims, 6 Drawing Sheets

(56) References Cited

U.S. PATENT DOCUMENTS

| | | |
|---|---|---|
| 2009/0020369 A1 | 1/2009 | Warachka |
| 2012/0168582 A1 | 7/2012 | Kelly |
| 2013/0068709 A1 | 3/2013 | Liu |
| 2014/0234018 A1* | 8/2014 | Imamura ............... F16B 17/004 403/273 |
| 2015/0173547 A1* | 6/2015 | Nelson ................... A47G 29/08 248/206.5 |

* cited by examiner

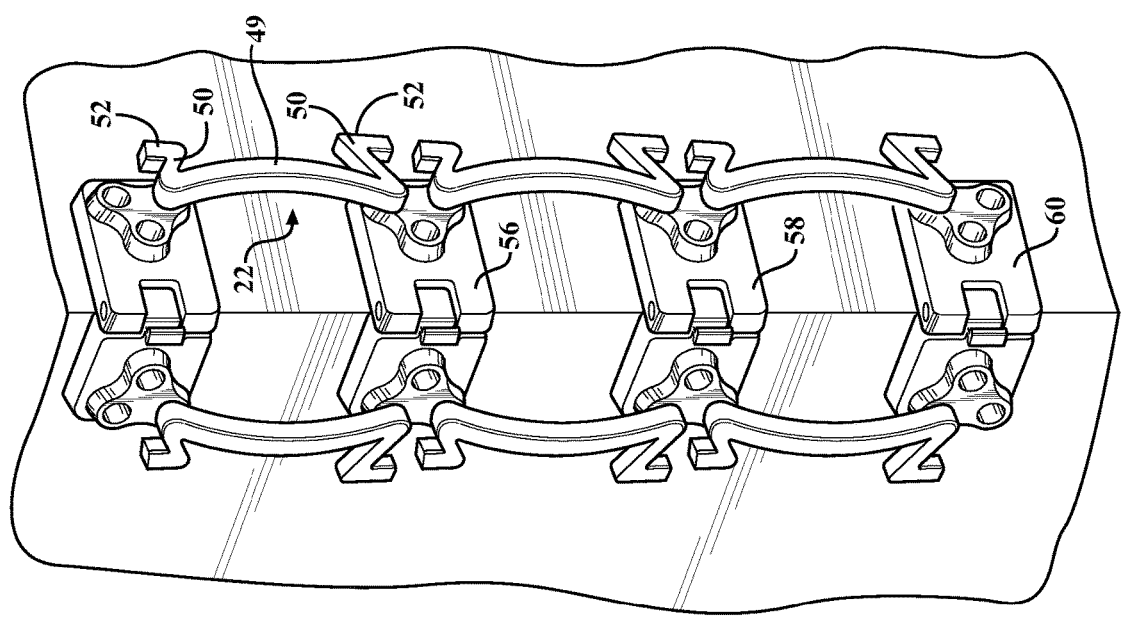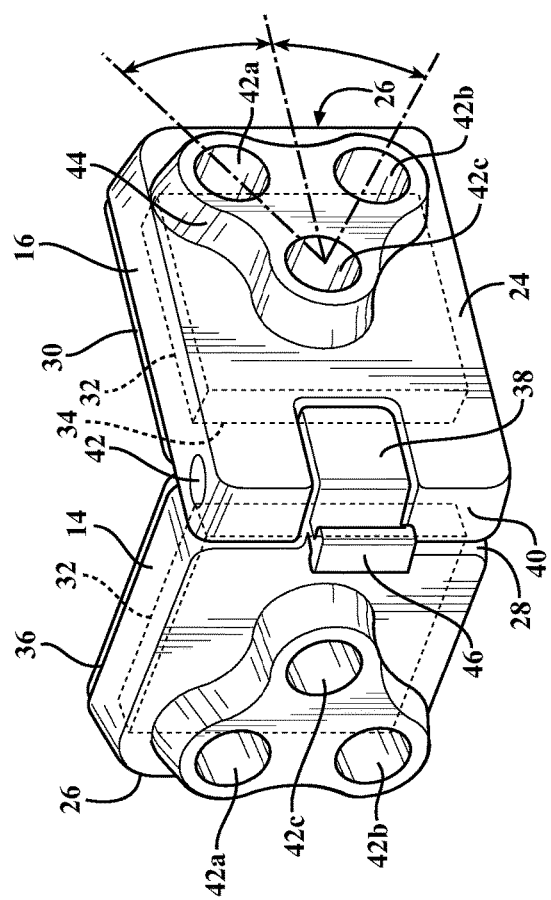

FIG. 5
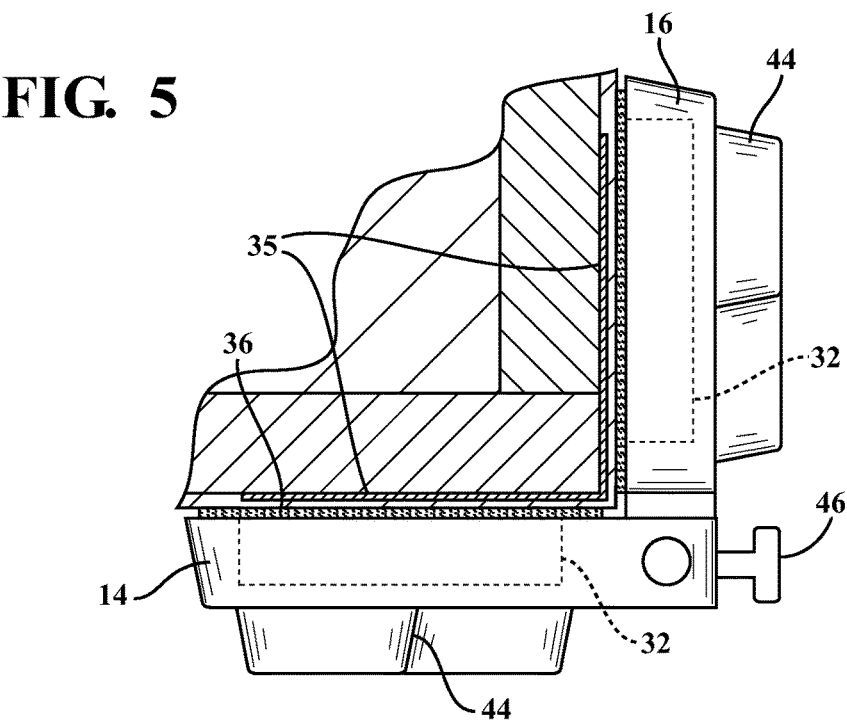
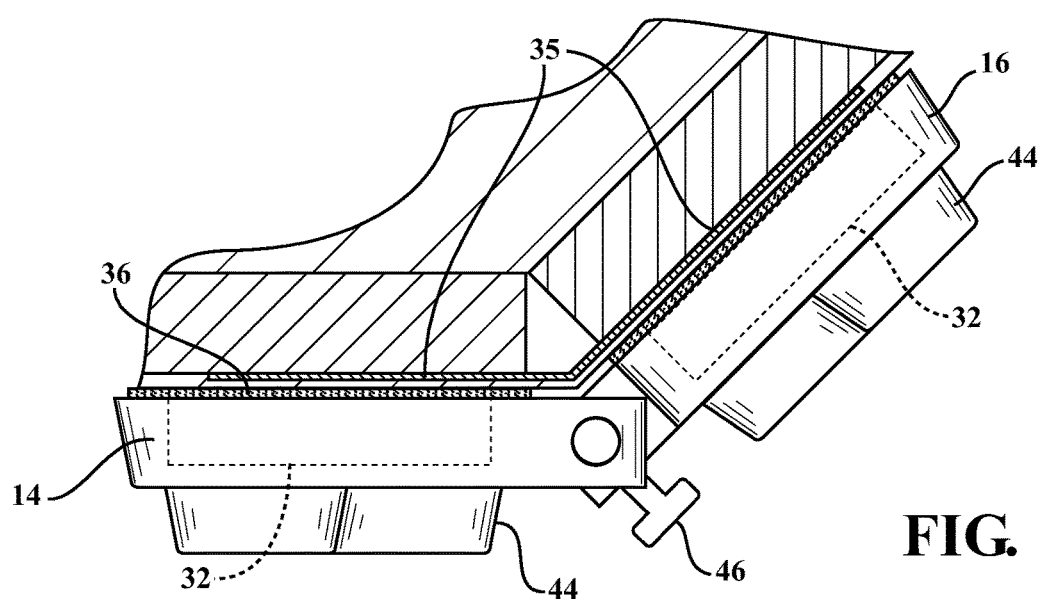
FIG. 6

MAGNETIC MOUNT

CROSS-REFERENCE TO RELATED APPLICATIONS

This application claims priority of U.S. Provisional Application 62/041,863 filed Aug. 26, 2014, the contents of which are incorporated herein by reference.

FIELD OF THE INVENTION

A device for magnetically mounting objects such as keys, pictures, and the like to surfaces and corner surfaces.

BACKGROUND OF THE INVENTION

It is known to use drywall or other types of wallboard as building materials for walls in a building. At the outside junction of perpendicular walls, a corner bead is embedded in the drywall or other wallboard. The corner bead is a metal piece having two flanges extending at 90 degree angles. It is known to provide a corner bead magnetic bracket such as disclosed in U.S. Patent Application Publication US 2012/0168582. The bracket has two lower portions extending at 90 degrees having magnets. The shelf extends over the two portions. The magnets magnetically attract to the corner bead to hold the bracket in place. However, many corners do not extend at true 90 degrees and may be slightly larger or slightly less than 90 degrees. It would be advantageous to have a support bracket that could be useful for a variety of objects and with corners that are not square.

SUMMARY OF THE INVENTION

A magnetic mount for supporting objects such as security cameras, photos, keepsakes, and the like includes a first body mounted to a second body by a hinge. The first and second bodies each have a cavity for holding a strong magnet such as a rare earth magnet and at least one attachment feature on the outer surface of the body. The mount also includes an object support member having a portion adapted to connect to the attachment feature. In one embodiment the object support is a generally elongated connector having a pair of ends. Each end has a mounting portion, one of which is inserted into an attachment member of one body and the other is inserted into an attachment feature of a second body of a second mount to connect two mounts together. The pair of mounts have increased holding power. The attachment feature may be a bore or a T-shaped member. An attachment feature may be positioned on the arm for mounting an object support for objects which are to extend at a 45 degree angle to a corner. Other object supports have portions which are received in the attachment feature.

BRIEF DESCRIPTION OF THE DRAWINGS

FIG. 3 is a perspective view of pairs of mounts, connectors, and object supports;

FIG. 4 is a perspective view of a mount;

FIG. 5 is a top view of the mounts in position on a square corner;

FIG. 6 is the mounts on a corner in which the walls extend at an oblique angle;

DETAILED DESCRIPTION OF THE INVENTION

Figure 1:
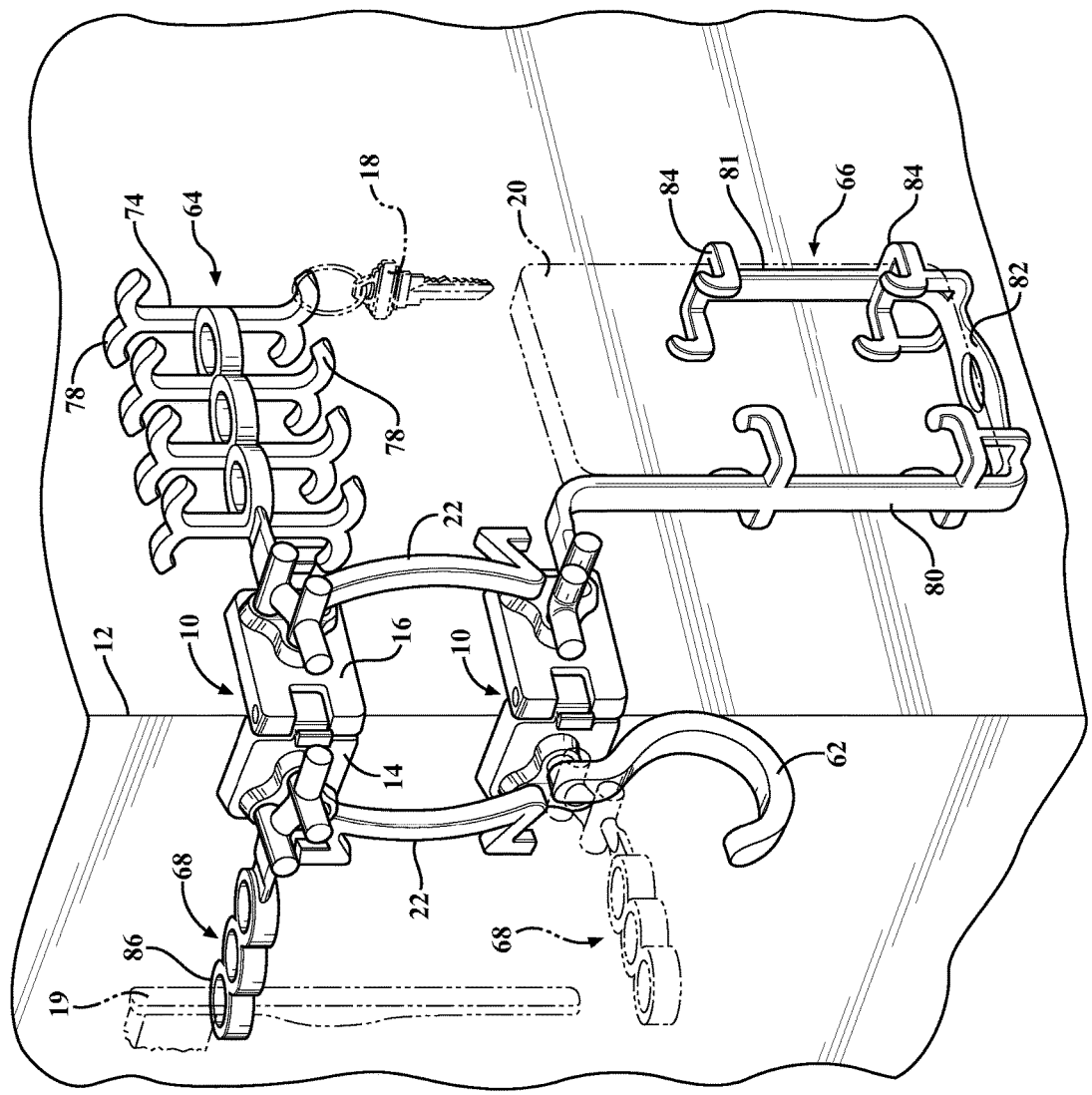
FIG. 1 is a perspective view of a pair of mounts and object supports.
Figure 2:
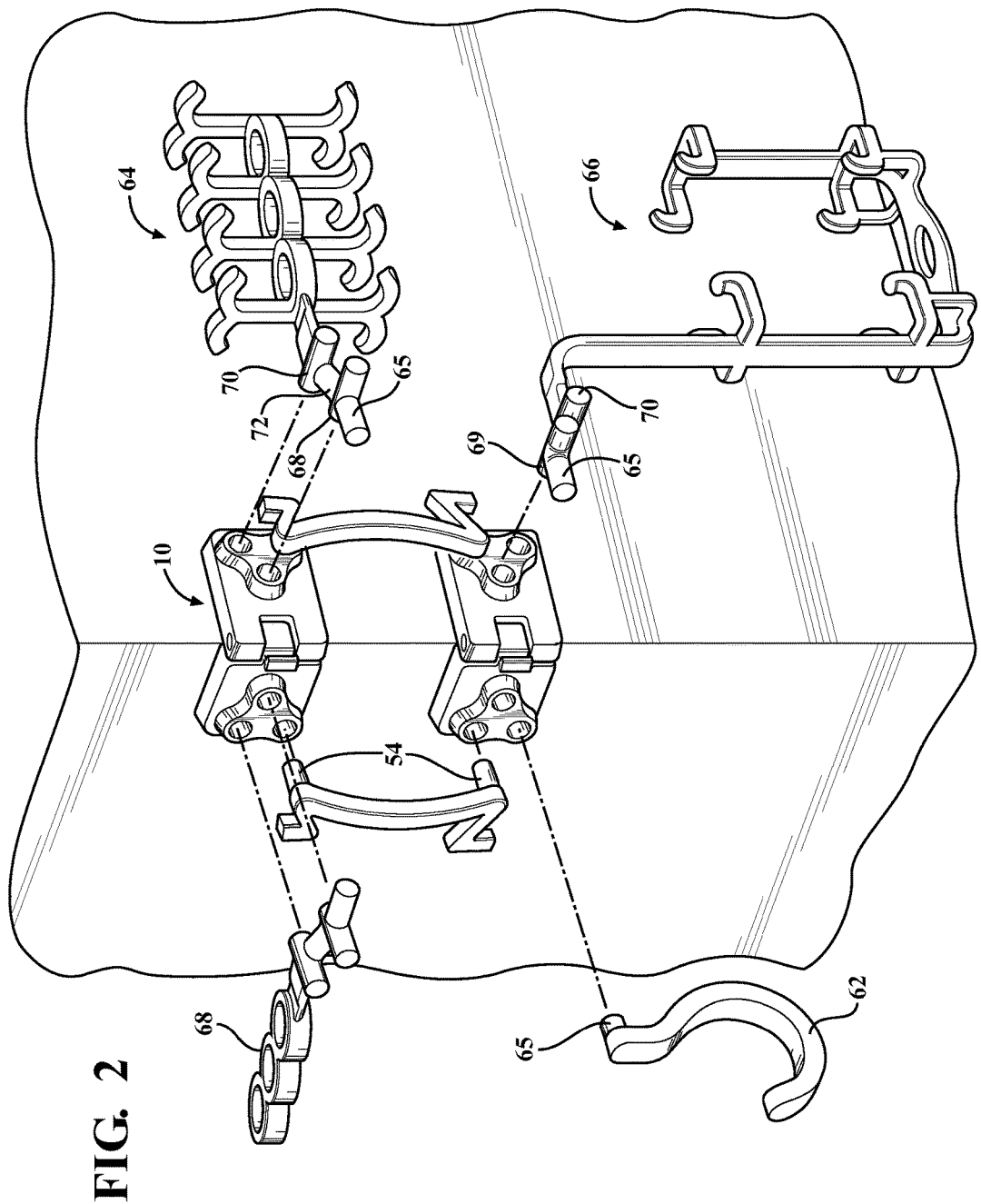
FIG. 2 is an exploded perspective view of the mounts in position in the corner of a wall with connectors.

A mount 10 for supporting objects on a corner 12 of a wall or on a flat panel (not shown) is shown in FIGS. 1 and 2. The mount includes a first body 14 and a second body 16 which are pivotally connected. Each of the bodies 14 and 16 have at least one attachment feature receiving a variety of object supports for supporting a number of objects such as a key chain 18, tool holder 19, and a cell phone 20. Two or more mounts 10 may be connected together by elongated connectors 22 to increase the ability of the mounts to support heavier weight.

As best shown in FIG. 4, each of the bodies 14 and 16 has an outer surface 24, an outer side 26, an inner side 28, and an underside 30. At least one magnet 32 is mounted into cavities 34 on the underside 30 of each body 14 and 16. The bodies are formed of a suitable moldable material such as polyethylene or nylon. A friction surface 36 covers much of the underside 30. The first body 14 includes an arm 38 which extends from the inner side 28 to between a pair of arms 40 of the second body. A pin 42 is press fit through a bore in the pair of arms 40 of the second body. The pin is freely received in a bore in the arm 38 to form a hinge which allows the first body 14 to pivot with respect to the second body 16. Alternatively, the bodies can be connected together with a hinge which is glued to either side edge of the first and second bodies or a living hinge can be formed to extend between the two bodies.

Figure 7:
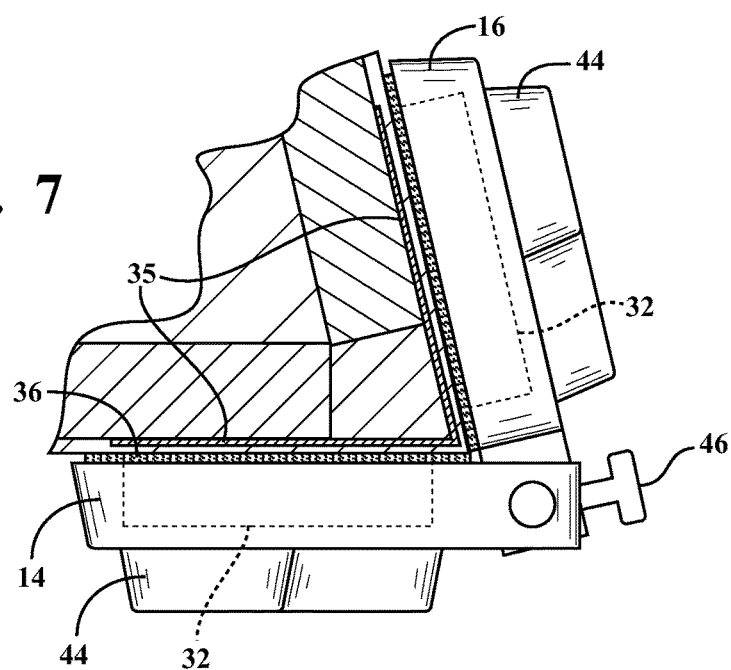
FIG. 7 is a top view of a mount on walls that extend at an acute angle.

As best shown in FIGS. 5, 6, and 7, the magnets 32 are positioned near the inner sides 28, 29, so as to be disposed opposite a wall bead 33. Because the bodies are hinged, the mount 10 may be used on a corner with a right angle (FIG. 5), on a corner with an obtuse angle (FIG. 6), or on a corner with an acute angle (FIG. 7). The mount may also be used on any planar surface (not shown). In the preferred embodiment, the magnets 32 are rare earth neodymium magnets which have high magnetic flux density. The magnets 32 may be mechanically attached to the bodies by over molding or may be secured in the cavities 34 with a suitable adhesive. The friction surface 36 is a layer of sandpaper or mesh or other friction increasing material. The friction surface 36 extends across the back side 30 and the magnets 32. The friction surface assists the magnets in holding the mount to a corner.

As shown in FIG. 4, the attachment features are three apertures 42a, 42b, 42c formed in a boss 44 on each of the bodies 14, 16 and a T-shaped portion 46 which extends outwardly from the arm of the first body 14. The apertures 42a, 42b, 42c are disposed in a generally equilateral triangle with two side apertures 42a and 42b extending parallel through the outer surface 26 and a center aperture 42c positioned inwardly from the pair of apertures 42a and 42b. Advantageously, a line extending from the center aperture 42c to each of the side apertures extends at an angle of 30 degrees, with respect to a horizontal axis of mount 10.

As shown in FIG. 3, the connectors 22 have a curved center portion 49 with a pair of ends 48. Each end has an angled portion 50 and a distal portion 52. The angled portion 50 and distal portion 52 form hooks to support objects (not shown). Cylindrical portions 54 extend perpendicular to a longitudinal axis. The cylindrical portions 54 are adapted to be received in one side aperture of one mount 10 and a side aperture of the second mount to connect the mounts together. As shown in FIG. 3, multiple groups of mounts 10, 56, 58, 60 can be connected together in this fashion by connectors 22 to greatly increase the holding power of the mounts.

As shown in FIGS. 1 and 2, the object supports can be a hook 62, a key ring holder 64, a cell phone holder 66, a tool holder 68, or connector 22. Each of the object supports has a cylindrical insertion portion such as the projection 66 on the hook 62 which is adapted to be received in one of the apertures 42a, 42b, or 42c of the attachment feature. The cell phone holder 66, key ring holder 64, and tool holder 68 each have two pairs of cylindrical portions 69, 70 which extend perpendicularly to the: cylindrical insertion projection 66. The pairs of cylindrical portions 69, 70 are spaced apart along a direction extending at a 30 degree angle to a longitudinal axis of the object support by an elongated portion 72. The cylindrical portions 69, 70 are spaced apart a distance equal to the distance between the center aperture 42c and one of the side apertures 42a, 42b. When the cylindrical portions 69, 70 are inserted into two of the apertures, the object support is supported along a generally horizontal axis as shown in FIG. 7, or can be rotated 90 degrees to be fixed along a generally vertical axis (FIG. 1).

As shown in FIG. 1, the key ring holder 64 has arms 74 spaced apart by rings 76. Each of the arms 74 has a hook portion 78 extending in opposed directions at the top and bottom of the arms 74. Thus, the key ring holder 64 may be used for many other objects, such as a key ring 18, in either alignment.

As shown in FIG. 1, the cell phone holder 66 has a pair of vertical arms 80 separated by a horizontal arm 82 and pairs of intermediate arms 84 extending towards each other from either of the vertical arms 80 to form an area to hold a cell phone 20 or other rectangular device. The tool holder 68 has a series of rings 86 that extend from the attachment portion to support tools or other implements which are dropped through the center aperture of the rings 86.

Figure 8:
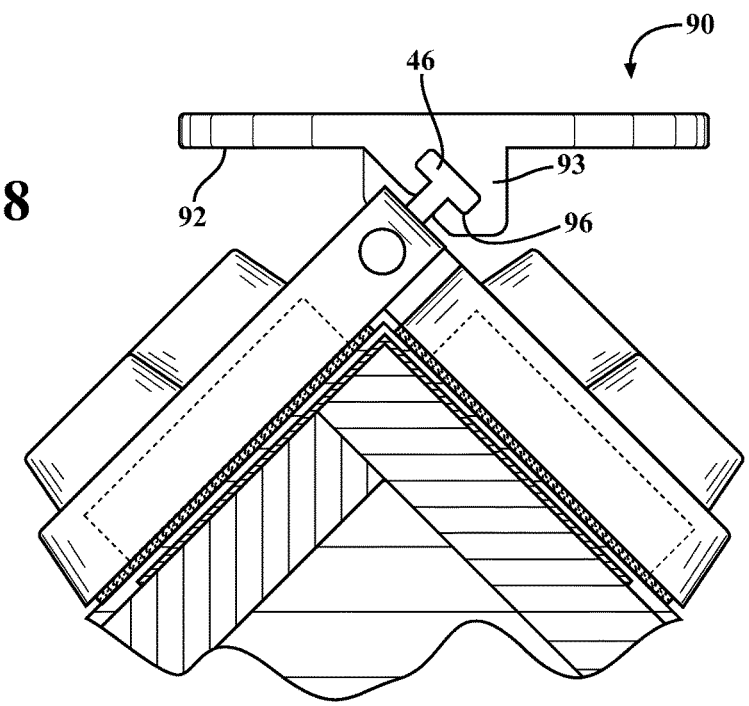
FIG. 8 is a bottom view of a circular disc object support on an attachment feature of the mount.
Figure 9:
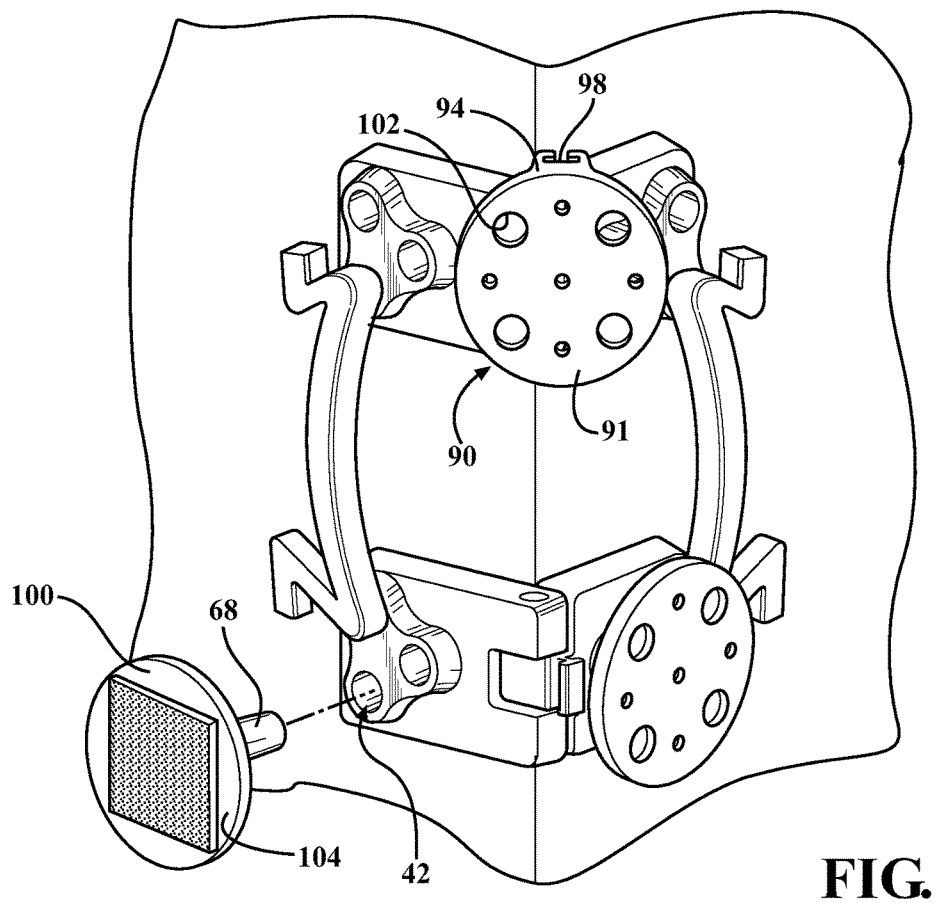
FIG. 9 is a perspective view of the disc shaped object support inverted.
Figure 10:
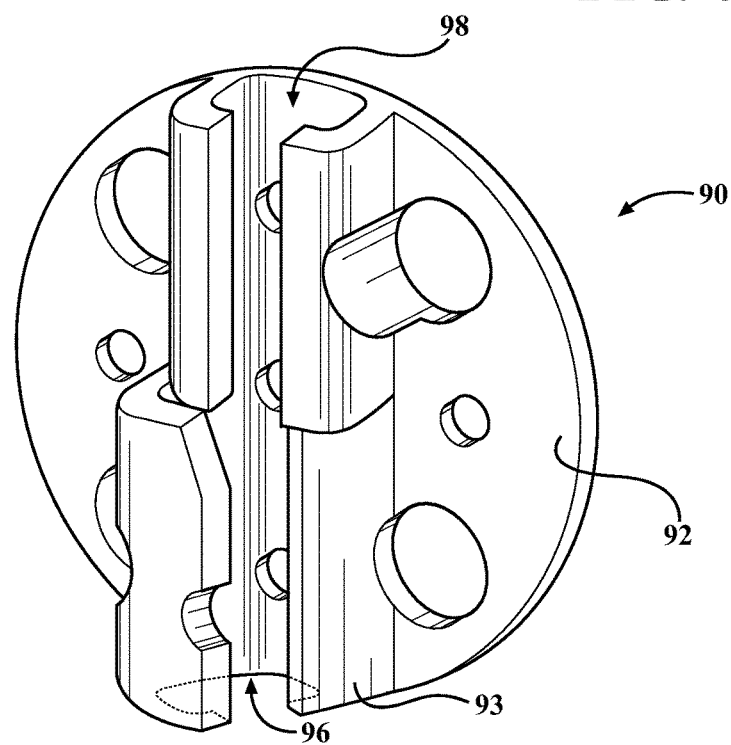
FIG. 10 is a rear view of the disc.

As shown in FIGS. 8, 9, and 10, an object support in the form of a disc 90 having a front surface 91 and a rear 92. A pair of protrusions 93, 94 extend from the rear 92. Each of the protrusions 92, 94 has a T-shaped slot 96, 98. The slots 96, 98 are offset from each other at an angle of 45 degrees. One of the slots permits the front surface 91 to be supported at a 45 degree angle to the corner of the wall. The other permits the disc to be supported parallel with one of the walls. The protrusion and slot are selected to dispose the disc as desired by the user. The disc may be rotated 180 degrees to place the desired slot at the top of the disc. The outer surface of the disc may have a Velcro pad or bores 98 to permit securing of a device such as a security camera to the disc.

As shown in FIG. 9, another object support is a disc 100 with a cylindrical portion 65 for insertion into an aperture 42 of the attachment feature. The disc has a Velcro pad 104 on a front surface.

Thus disclosed is a mount for the corner of a wall or a flat surface which has attachment features permitting two or more of the mounts to be joined together and/or to support a variety of different object supports for mounting objects to any corner regardless of the angle.

It will be apparent to those skilled in the art that many variations are within the scope of the invention.

I claim:

1. An object support adapted for connection to a mount, the object support comprising:
a disc having a front surface and a rear surface, the rear surface having a first elongate slot defining a first slot axis and a first cross sectional slot profile, and a second elongate slot defining a second slot axis generally aligned with the first slot axis and a second cross sectional slot profile, the second slot profile having substantially the same shape as the first slot profile rotated by an offset angle about the first or second slot axis, the first and second slot axes extending generally parallel to and spaced rearwardly from the rear surface.

2. The object support of claim 1, wherein the first slot profile and second slot profile are T-shaped, and the offset angle is 45 degrees.

3. The object support of claim 1, the front surface comprising an object attachment feature.

4. The object support of claim 3, the object attachment feature being selected from the group consisting of a hook-and-loop fastener pad and a bore.

5. An object support assembly comprising the object support of claim 1 connected to a mount, the mount including a mating portion mated with a selected one of the first elongate slot and the second elongate slot and configured to alternately mate with the other of the first and second elongate slots.

* * * * *